Patented Oct. 15, 1935

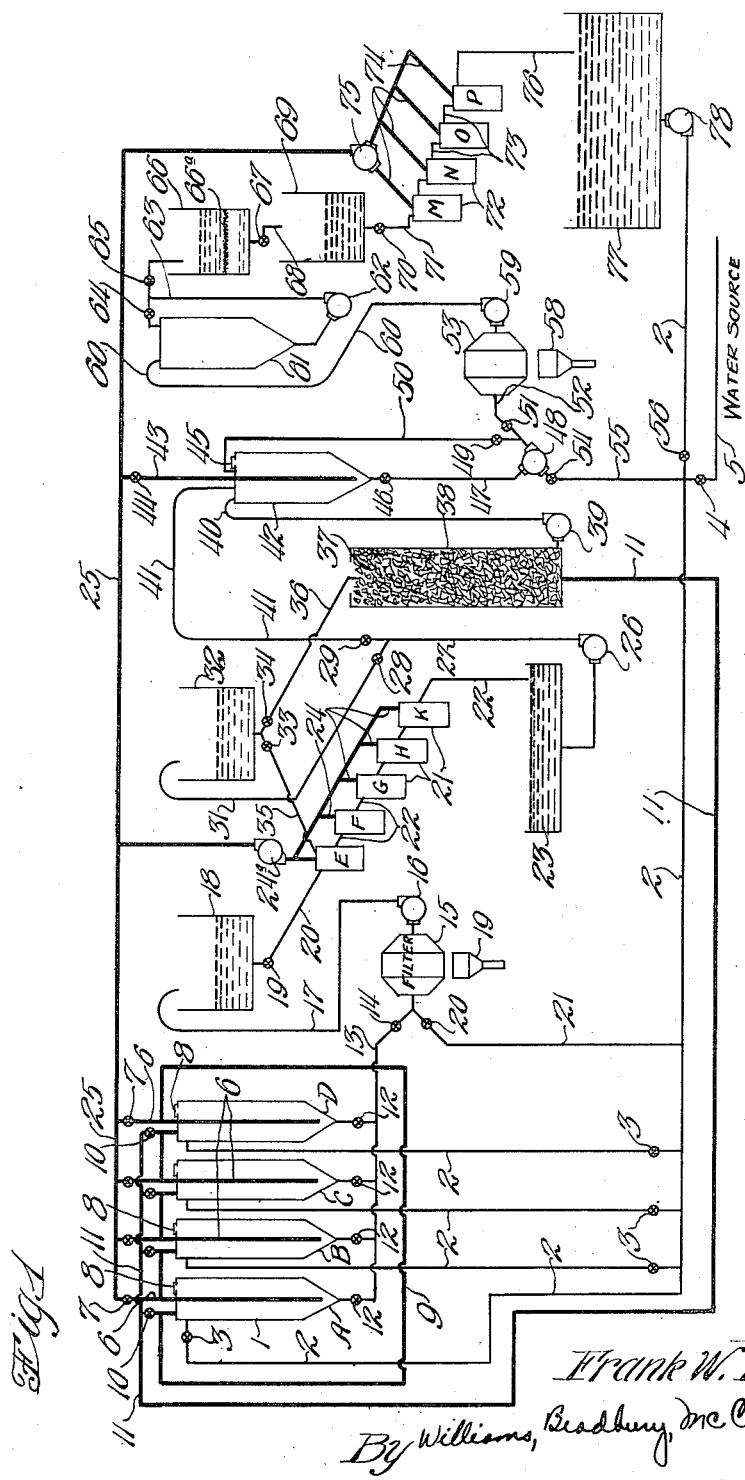

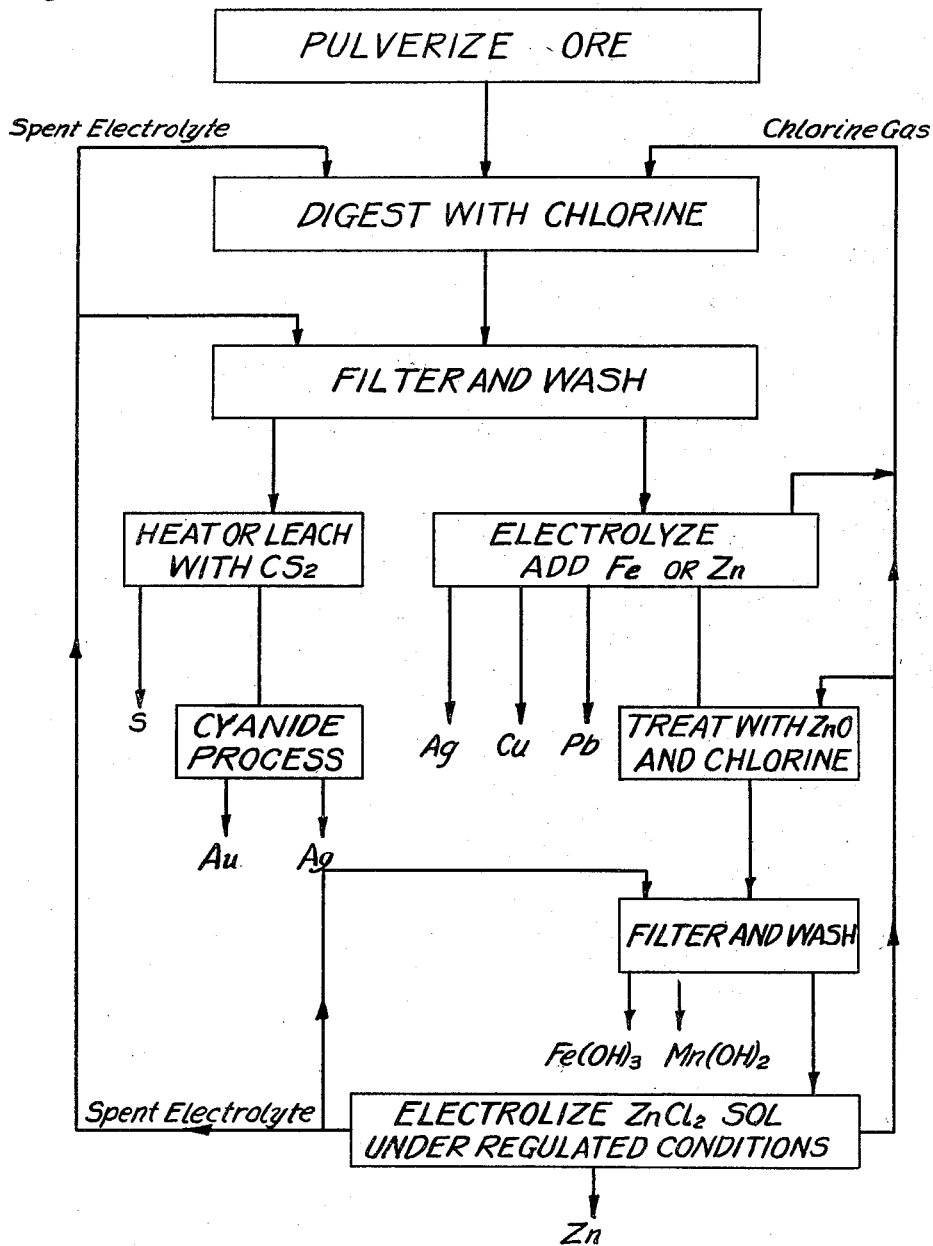

2,017,330

UNITED STATES PATENT OFFICE 2,017,330

METALLURGICAL PROCESS AND APPARATUS

Frank W. Traphagen, Golden, Colo., assignor, by mesne assignments, to Ore Solvents Corporation, a corporation of Delaware Application February 7, 1929, Serial No. 338,062

8 Claims. (Cl. 204—15)

This invention pertains to a metallurgical process utilizing wet chlorination to effect the solution of base metals and silver from complex ores and utilizing chemical and electrolytic means for separating the metals from each other and recovering them in a pure state. This application is a continuation in part of my co-pending applications Serial No. 265,764, entitled Process of the recovery of metals from their ores, filed March 29, 1928, and Serial No. 302,533, entitled Improved wet chlorination process, filed August 28, 1928.

The object of my invention is to provide a process which will recover a maximum yield of metals with a minimum amount of power, expense and nuisance,—a process by which it will be commercially practicable to recover metals from ores, slags, tailings, etc. that were hitherto considered worthless, and a process which is flexible and readily applicable to practically any ore, slag or metal bearing material.

Many efforts have been made to develop a successful chlorine treatment for the solution and separation of metals. The numerous processes developed to chlorinate the dry ore have encountered serious difficulties:—the mass becomes hygroscopic, it agglomerates, becomes sticky, hard to handle, and the chlorine does not come in contact with particles coated with this sticky mass; the chlorine must be thoroughly dried, which is practically impossible on a commercial scale because of the extremely corrosive nature of the gas; the temperatures are necessarily very high and unstable, uniformity is impossible, sulphur melts and vaporizes, zinc chloride and other compounds sublime or melt. The history of the art is full of examples of processes which have been unable to bear up under these difficulties.

Processes for the application of chlorine to wet pulps have also met with difficulties, difficulties that have been so serious that this process has been entirely abandoned. In this case the bugbear of sulphuryl chloride arose to give the characteristic formation of hydrochloric acid and sulphur dioxide, the latter being oxidized by the free chlorine to give sulphuric acid. These acids act on the ore to give hydrogen sulfide gas, which tends to reverse the solvent action of the chlorine. Some of this hydrogen sulfide gas also escapes with the chlorine and becomes a very troublesome nuisance.

Baker and Smith (U. S. Patent No. 843,986) try to avoid these difficulties by the use of ferric chloride formed by the application of chlorine to ferrous chloride in a separate tower, but this reaction is too slow to be commercially practicable, and the large amount of ferric chloride formed a corrosive solution which is very difficult to handle.

The object of this invention is to overcome all of these difficulties which have caused the failure of prior processes.

A further object is to directly apply chlorine gas to a pulp in such a manner and under such conditions that practically all base metals and silver in complex ores are readily converted into soluble chlorides (the gold, gangue, sulphur and some of the silver, etc. remaining in insoluble form) without the formation in harmful quantities of sulphur chlorides.

A further object is to provide a cyclic process wherein there are no waste by-products wherein the chlorine generated in the several parts of the process is all utilized in other parts, wherein the spent liquor from the electrolysis is continuously re-used and wherein the concentrations, temperatures, sequence of steps and apparatus are so regulated and designed that a simple, rapid, quantitative solution and separation of metals is effected without giving rise to the reactions or difficulties that have heretofore caused failure.

A further object is to recover more zinc per horsepower than is now possible.

A further object is to use concentrations and apparatus to utilize at maximum efficiency the heat generated by the reaction and to obviate the necessity of evaporation or dilution throughout the entire process.

A further object is to minimize the nuisance in the form of noxious gases which so often are a menace to the health of attendants.

A further object is to simplify the preliminary treatment for complex ores, it being only necessary for the ore to be pulverized or finely ground.

A further object is to provide a process in which the sulphur may be recovered and sold at a profit instead of being wasted in the form of sulphur dioxide to devastate the surrounding vegetation.

A further object is to provide a chlorine treatment in which the formation of plastic sulphur is avoided. Plastic sulphur coats the particles and prevents their solution and also gums or stops up the pipes, and is very objectionable. The sulphur in my process is left in microscopic form.

A further object is to avoid the solution of excessive iron, that is, more than is necessary in securing maximum commercial extraction.

A further object is to minimize the corrosiveness of the solutions and to keep the gold in the residue. This is accomplished by carefully regulating the amount of chlorine added in the digestion.

A further object is to recover a maximum amount of valuable metals and to decidedly increase present yields. Retort zinc processes yield about 80% of the zinc, while my process yields more than 90%. The yield of copper, lead and other metals is likewise increased.

A further object is to provide an arrangement of apparatus whereby maximum efficiency can be obtained and to provide digesters, filters, electrolytic cells, etc., which are especially adapted for this process. Other objects will be apparent as the detailed description of my invention proceeds.

My invention may be generally described as a continuous cyclic process wherein finely pulverized complex ores, preferably sulfides, are suspended in an aqueous pulp and digested by the direct application of chlorine gas. The product of the digestion is filtered, the residue containing sulphur in microscopic form, gold, some silver, lead, etc., and the gangue material, from which the sulphur may be extracted by leaching or by distillation, after which the gold and silver may be recovered by cyaniding. The filtrate from the digested product is electrolyzed or treated with iron or zinc to remove silver, copper, lead, etc., the resulting solution is treated with zinc oxide and chlorine to remove the iron and manganese, and after all impurities are removed from the resulting zinc chloride solution it is electrolyzed to yield pure metallic zinc, the resulting chlorine being utilized in previous steps of the process and the spent electrolyte being also used in the digesting process and in washing the filters. The important features of this process are the concentrations, temperatures, rate of supplying chlorine, general sequence of steps, and the arrangement of the apparatus, as will be hereinafter more specifically defined.

In the accompanying drawings, which form a part of this specification, Fig. 1 is a diagrammatic representation of the apparatus; and Fig. 2 is a flow-sheet of my improved process.

Ores

My process is particularly adapted for the treatment of complex ores with zinc as the basis. Examples of such ores are zinc blend (ZnS), galena (PbS), chalcocite ($Cu_2S$), covellite (CuS), bornite, chalcopyrite, and other sulfide ores.

I am not limited, however, to complex sulfide ores, and my process is especially adaptable to the treatment of slags, tailings or other metal bearing material in which the metal content is not sufficient to warrant treatment by other processes.

In all cases, and especially when the ores consist of oxides, carbonates, silicates, etc., I carry out the process with enough iron present to accelerate the reaction and render it commercially feasible. I find that the iron in changing from ferric to ferrous acts as a catalyst and as such plays an important part in the digestion step.

The expression "ores" as used in the appended claims is intended to cover not only complex zinc sulfides but any other ores, tailings, slags or metal bearing material.

Digestion and filtration

In describing a preferred embodiment of my invention I will give the details of my process as applied to silver plume concentrates, an ore containing about

| | |
|---|---|
| Zinc | 42.3% |
| Iron | 11.2% |
| Lead | 6.7% |
| Insoluble matter | 6.7% |
| Manganese | .9% |
| Silver | 30 ounces per ton |
| Gold | 0.1 ounce per ton |

While my description is limited to a particular ore and to particular concentrations and temperatures, it is understood that this is illustrative only and that I am not limited to these details except as defined by the appended claims.

Referring to Fig. 1, four digesters I are indicated by the letters A, B, C, and D. These digesters are all identical, each of them comprising a cylindrical tank with a conical bottom and a gas-tight top. The tank is preferably made of tantalum or glass lined metal. It is particularly important that all parts of my apparatus be of material that is not attacked by chlorine.

Water or spent electrolyte is introduced into tank A by pipe 2, the valve 3A being open and valves 3B, C, and D being closed. When the process is first started it will be necessary to use water by opening valve 4 to the water supply 5. When the process is once initiated spent electrolyte will always be introduced into the digesters I through pipes 2.

Chlorine is then bubbled into the water or spent electrolyte through pipes 6 which are preferably mounted in the top of the digesters I by slidable gas-tight connections so that they may be moved up or down. The amount of chlorine is regulated by suitable valves 7 between the pipes 6 and the chlorine gas mains. The tubes 6 are preferably of fused silica and are provided at the bottom with a plurality of spaced apertures for distributing the gas and diffusing it in fine bubbles to obtain maximum absorption and agitation of the liquid in the tank.

Each digester I is provided with a removable cover plate 8 for the introduction of pulverized ore, the cover being replaced in gas-tight position after the ore is introduced.

A gas outlet pipe 9 connects the top of each digester to the gas inlet pipe of its succeeding digester so that any chlorine which is not utilized in one tank may be forced into the following tank. Since the gas in the mains is under a pressure necessary to overcome the head of the pulp in the digester, it will be necessary to include an injector in each of the pipes 9 to force the chlorine to the bottom of the next digester. To avoid further complicating the drawing, this injector is not shown, but it may be in the form of an aspirator, preferably utilizing steam, and is sufficiently well known in the art to warrant further description unnecessary.

It will thus be seen that the unused chlorine from one tank is introduced into the following tank together with the added chlorine from the gas mains. The chlorine from the last tank, however, is led through a valve 10 and a suitable pipe 11 to a chlorinating tower, which will be later described, the purpose of which is to absorb the last traces of chlorine and avoid its escape into the atmosphere. The valves 10 interconnect pipes 9 and 11, and by proper manipulation the chlorine may be directed into any succeeding tank or to the chlorinating tower as desired.

Each of the digesters is provided at its base with a valve 12 leading to a pipe 13 which carries the treated residue through valve 14 to filter 15.

The filter is preferably of the rotating asbestos type in which the liquid flows between asbestos discs with drains toward a central pipe so that the maximum filtering area is provided and so that the filter may be readily cleaned. The filter per se forms no part of the present invention and will not be described in detail.

The filtrate is forced by pump 16 through a pipe 17 to a storage tank 18. The residue is collected in a suitable container 19. The filter is thoroughly washed by closing the valve 14 and opening valve 20, whereby the spent liquor from pipe 2 is utilized.

The residue from container 19 may be dried and the sulphur extracted with carbon disulfid or the residue may be heated to remove the sulphur by sublimation. In either case sulphur is recovered in elemental form and may be sold on the market at a profit, especially when the process is carried on in localities at a great distance from sulphur mines. The ore of the present treatment yields about 25% of free sulphur.

After the sulphur is extracted the residue (about 20% of original ore) is treated by the cyanide process to remove the gold and silver. If pyrites are present, it may be necessary to roast the residue before this extraction, but the small amount of pyrites present will not make this step particularly objectionable.

If lead chloride is present in the residue, it may be extracted with hot water and crystallized therefrom as is well known in the art.

Separation of silver, copper, lead, etc.

From storage tank 18 the filtrate containing metal chlorides is led through valve 19 and pipe 20 to suitable electrolytic cells 21, E, F, G, H, and K, suitable connecting pipes 22 conducting the electrolyte from E to F, F to G, G to H, etc. From the last electrolytic cell the spent electrolyte is conducted to a storage tank 23.

Each of the electrolytic cells is diaphragmed for collecting the chlorine gas which is conducted away by pipes 24 and forced by blower 24A to the chlorine gas mains 25, from which it is admitted to the digesters as heretofore described.

The electrolytic cells per se form no part of my invention and may be briefly described as chlorine resisting containers with iron or graphite anodes and iron, aluminum or copper cathodes. If iron is used as an anode, ferric chloride will be formed which may be utilized in the later steps of the process. If iron is already present, graphite electrodes should be used so that chlorine gas may be liberated and used in the first steps of the process.

It is essential that the voltage in all of these cells be maintained at 2 volts or less because at this voltage copper, lead, etc. are plated, while zinc remains in solution because its decomposition potential is higher than 2 volts.

Instead of separating the silver, copper, lead, etc. electrolytically, I may utilize a chemical separation by adding metallic iron or metallic zinc to the solution, since either of these metals will replace those below it in the electromotive series.

Separation of iron and manganese

The solution from storage tank 23 may be forced by pump 26 through pipe 27 and valve 28 (valve 29 being closed) through pipe 31 to storage tank 32. From this tank the solution can be returned by opening valve 33 (valve 34 being closed) through pipe 35 to the first cell 21E of the copper, lead, silver, electrolytic separation series. If the separation is complete, however, valve 33 will be closed and valve 34 open, whereby the solution may pass through pipe 36 to distribute the solution over the filler material 37 of coke, etc. in chlorinating tower 38, which is supplied with chlorine by pipe 11 leading from the digesters as heretofore described. The solution passing through this tower absorbs the last traces of chlorine and is then rendered in a condition for the separation of iron. It is raised by pump 39 in pipe 40 or by pump 26 through pipes 27, valve 29 and pipe 41 (valve 28 being closed) to treating tank 42, wherein chlorine is introduced by a tube 43 having a regulating valve 44 connecting to the gas main 25. The iron is precipitated by the addition of zinc oxide through the cover 45 of this treating tank, the iron being precipitated as ferric hydroxide. If desired, it may be separately recovered and the manganese may be later recovered by further chlorination in the presence of the zinc oxide. I prefer, however, to separate both iron and manganese in one step by introducing zinc oxide and treating with chlorine as above described.

The zinc oxide may be prepared by roasting a small amount of the zinc blend in a conventional manner.

The recovered product of tank 42 is led through valve 46 and pipe 47 to pump 48, which either forces it back into the tank through valve 49, pipe 50 or through valve 51 and pipe 52 to filter 53 for separating the iron and manganese hydroxides from the zinc chloride solution. By opening valve 54 and pipe 55 and closing valve 46 and pipe 47, spent liquor from the final electrolysis may be used to wash filter 53. If it is desired to use pure water for this washing, I may close valve 56 and open valve 4.

The residue from the filter, which in structural details is similar to filter 15, is washed and collected in a suitable hopper 58 and is subsequently dried and may be utilized to furnish iron for pigment or for other purposes.

Electrolysis of zinc chloride

The filtrate from filter 53 is raised by pump 59 through pipe 60 to treating tank 61 where zinc dust is added to remove any impurities that may have been introduced in prior steps. A pump 62 may recirculate this liquid through pipe 63 and valve 64 or may empty tank 61 through pipe 63 and valve 65 to storage tank 66 which has a false bottom 66A for the removal of cementitious products. The purified zinc chloride from this tank is led through valve 67 and pipe 68 to feeder tank 69 from which it flows through valve 70 and pipe 71 to electrolytic cells 72 M, N, O, P, pipes 73 leading the electrolyte from M to N, N to O, etc.

The electrolytic cells are likewise diaphragmed to collect the chlorine gas evolved, which is conducted away by pipes 74 and forced by a pump 75 to the chlorine gas mains 25.

The spent electrolyte from P is led by pipe 76 to a storage tank 77 from which it is forced by suitable means 78 to the digesters 1 and to filters 15 and 53.

The electrolytic cells for the zinc recovery are preferably chlorine resisting materials with graphite anodes and aluminum cathodes. The voltage should be kept between 2.8 and 3 volts, and the best results are obtained when the voltage is 2.8. The solution in cell M preferably contains 150 grams of zinc metal per liter of solution, and the electrolyte in P contains about 50 grams per liter. The acidity of the electrolyte is critical and should be maintained between pH2 and pH3.5, the best results being obtained with a pH of 2.5 to 3. The arrangement of electrodes should be such that the voltage can be closely controlled. The temperature should be between 15 degrees C. and 30 degrees C., and best results have been obtained when it is 20 degrees C. The acidity, temperature, current density and voltage should be carefully regulated, as the zinc is thereby deposited in fine granular metallic state, while if these conditions are not observed an amorphous impure deposit is formed which sloughs off and settles to the bottom, thereby requiring a large amount of electrical energy and forming a product which is difficult to melt and which is contaminated by impurities.

Distinctive cyclic features

I have found that the best results are obtained when the temperature in the digesters is relatively high, preferably at or near the boiling point. The pressure in the digester should be low enough, however, to prevent the boiling point of the solution from rising above the melting point of the sulphur.

The pulverized ore is preferably mixed with the solution in the proportion of 1:1 to 1:4 by weight and will naturally depend upon the ore which is being treated. In the present instance I use a 1:1 mixture and add the chlorine gas at such a rate that the metallic sulfides are converted into chlorides in from three to four hours. An analysis of the ore will indicate the amount of chlorine required and this amount is distributed over the three or four hour period. The proportion of water used and the rate of introducing chlorine bring about the optimum temperature conditions for the reaction.

In this reaction iron is usually present and it is necessarily present when the ores contain oxides, silicates, carbonates, etc. If the iron in the ore is not sufficient for this purpose, it may be separately introduced and may, for instance, be obtained from the iron anodes or scrap iron used in precipitation of silver, copper and lead. The iron acts as a catalyst to a certain extent, the ferric chloride acting to dissolve the sulfides, thereby being reduced to ferrous chloride, and the chlorine immediately re-converting the ferrous chloride to the higher state of oxidation so that it may function as above stated. I do not rely on this action entirely, and for ordinary sulfide ores the reaction will take place in the absence of iron due to the direct action of the chlorine on the pulverized ore. By using the proportions and temperatures above stated I find that the reaction takes place very rapidly (both direct and catalytic), the sulphur is set free in microscopic form, and practically no sulphuryl chloride or other sulphur chlorides are formed. The small amount of sulfates which sometimes occur are not harmful and may be easily removed by precipitation with calcium chloride or other means well known in the art.

By using the proportions and temperatures above stated and by using the apparatus above described I find it possible to continuously operate this cycle without evaporation or concentrating the solutions at any time. The zinc chloride from the digester may contain as much as 400 grams of zinc per liter. This solution is too concentrated for the final electrolysis in cells 72 M, N, O, and P. The filters 15 and 53 serve to dilute this solution, however, and would probably dilute it to too great an extent were it not for the fact that zinc is added in the iron removal step and final purification. The process is so arranged that no water need be removed from or added to the aqueous solutions.

The steam used as an injector to force chlorine from the top of one tank to the bottom of the next tank and to thereby assist in the agitation of the pulp in the tank merely adds to the system water which is lost by the unavoidable evaporation from the chlorinating tower and from the various storage tanks, etc. If desired, steam may also be applied to the filters as a final step in washing the residues. The steam system is not shown in the accompanying drawings, because they are already sufficiently complicated, but it is understood that a steam supply is available to assist in the agitation of pulp in the digesters to wash the residues in the filters, etc.

Ferric chloride is extremely corrosive, and in order to minimize its effect on the apparatus, filters, etc., I prefer to regulate the amount of chlorine added to the digester and to cut off the supply before digestion is completed, some of the undissolved sulfides being brought into solution by the chlorine in the ferric chloride, thereby reducing it to ferrous chloride, which can be more readily handled. The agitation in the digester may be brought about by steam after the chlorine is shut off, since this final step requires a very short time.

Iron pyrites are sometimes not readily dissolved in the digester, and I prefer to avoid the solution of any more iron than is necessary in securing maximum commercial extraction of metals in the ore being treated. I find that less than 5% iron, 50 grams per liter, is sufficient for my purpose.

By discontinuing the chlorine digestion before the action is entirely completed, I not only minimize the corrosive action of the solution by reducing ferric chlorides to ferrous chlorides, but I also keep the gold in the residue and reduce the amount of precipitating agent which is later required to remove impurities. By keeping the gold in the residue and extracting it after the removal of sulphur, I obtain much better results than by attempting to get it in solution by chlorination. By carrying out the entire treatment in the closed system and by using a tower for removing the last traces of chlorine, I minimize the nuisance from noxious gases, and it will be readily seen that this process is vastly more desirable than a roasting process which disseminates poisonous sulphur dioxide fumes. The only initial treatment required is pulverization, and the horsepower for the subsequent separation and recovery is the minimum. I recover more than 15 pounds of zinc per horsepower day by my chlorine process, whereas the sulphuric acid process now in use produces only about 12 pounds of zinc per horsepower day. Furthermore, my process recovers 41.3% (out of the 42.3% as above stated) of the zinc.

While I have given a detailed description of my process as applied to sulphur concentrates containing a large amount of zinc, it is understood that I am not limited to the treatment of any particular type of ore nor to any of the details above set forth. A characteristic of my process is its flexibility and its applicability to any and all metal bearing substances.

Many of the steps may be substituted by equivalent steps in accordance with well known metallurgical practice. Valves may be placed where they are found necessary, various modifications of the pumping system are contemplated, further means may be used to avoid chlorine nuisance (for instance the chlorine will be led from treating tank 42 to pump 24A or 75 or to tower 38).

I have not tried to represent in the drawings the relative size or actual arrangement of my apparatus, the drawings being merely to enable those skilled in the art to understand and practice my invention.

I claim:

1. In the process of treating complex sulphide ores by applying chlorine directly to an aqueous suspension of the pulverized ore thereby directly liberating sulphur therefrom, introducing the chlorine at a rate to keep the temperature of the solution near the boiling point and keeping the pressure below the point at which the boiling point of the solution will equal the melting point of sulphur.

2. In a metallurgical process, the step of directly applying chlorine directly to a pulp of pulverized sulphide ore in aqueous suspension thereby directly liberating sulphur therefrom, the chlorine being supplied at a rate to give a high temperature below the melting point of sulphur.

3. The method of converting metallic sulphides to chlorides which consists in agitating an aqueous pulp of pulverized sulphides by the direct application of chlorine thereby directly liberating sulphur therefrom, the proportion of solution to pulverized sulphides being regulated to produce a reaction temperature near the boiling point of the solution and below the melting point of sulphur.

4. In the process of treating complex ores by directly applying chlorine to aqueous suspension of pulverized ore containing iron, stopping the introduction of chlorine before the action is complete, and continuing the agitation to convert ferric chloride to ferrous chloride before filtration.

5. The process of treating complex ores which consists of pulverizing the ore, digesting it with chlorine in aqueous suspension, filtering and washing, recovering gold and silver from the residue, electrolytically removing the silver, copper, and lead from the filtrate, precipitating iron and manganese by chlorinating in the presence of a metallic oxide, filtering, removing the remaining impurities, electrolyzing the resulting zinc chloride solution to recover metallic zinc, returning the chlorine to the digestion step and to the iron precipitating step, and returning the spent electrolyte to the digestion step and to the filters.

6. In a process for the treatment of sulphide ores, the step of eliminating iron and manganese separately from a solution containing these metals, consisting in chlorinating the solution to the point that the iron is converted to ferric chloride, adding zinc oxide and filtering to remove iron, and chlorinating in the presence of zinc oxide, whereby to effect precipitation of manganese.

7. The process of treating complex ores which consists of pulverizing the ore, digesting it with chlorine in aqueous suspension, filtering and washing, removing gold and silver from the residue, electrolytically removing the silver, copper and lead from the filtrate, precipitating iron and manganese by chlorinating in the presence of a metallic oxide, filtering, removing the impurities, recovering metallic zinc by electrolyzing the resulting zinc chloride solution, maintaining the acidity of said solution between pH3 and pH3.5 during such electrolysis, and returning the recovered chlorine and spent electrolyte to prior steps in the process.

8. The process of treating complex sulphide ore containing iron, the steps of pulverizing the ore subjecting it to agitation in a relatively small amount of water and supplying chlorine thereto, terminating the supply of chlorine before the chlorination is complete, and continuing the agitation to convert ferric chloride to ferrous chloride.

FRANK W. TRAPHAGEN.